United States Patent
Van der Steen

(10) Patent No.: US 8,262,397 B1
(45) Date of Patent: Sep. 11, 2012

(54) CARD EJECTOR HAVING A SLIDER AND A SPRING ENGAGING A STOPPER ON A METALLIC SHELL

(75) Inventor: Hendrikus P. G. Van der Steen, Den Dungen (NL)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 13/089,361

(22) Filed: Apr. 19, 2011

(51) Int. Cl.
*H01R 13/62* (2006.01)

(52) U.S. Cl. ..................................................... 439/159

(58) Field of Classification Search .................. 439/159, 439/157, 158, 188, 155, 630
See application file for complete search history.

(56) References Cited

U.S. PATENT DOCUMENTS

| 7,278,866 B1 * | 10/2007 | Van der Steen | 439/159 |
| 7,410,375 B2 * | 8/2008 | Van der Steen et al. | 439/159 |
| 2009/0298316 A1 | 12/2009 | Maruyama | |

FOREIGN PATENT DOCUMENTS

CN 100573562 12/2009

* cited by examiner

*Primary Examiner* — Chandrika Prasad
(74) *Attorney, Agent, or Firm* — Ming Chieh Chang; Wei Te Chung; Andrew C. Cheng

(57) ABSTRACT

An electrical card connector (100) includes an insulative housing (1), a number of contacts (2) assembled in the insulative housing, an ejector (4) assembled at a side of the insulative housing, and a metallic shell (3) comprising a stopper portion (313). The ejector includes a slider (41) moveable along a mating direction and an ejection direction opposite to the mating direction, a spring member (43) for urging the slider to move along the ejection direction, and a pin member (42) having one end (421) secured on the insulative housing and the other one end (422) moveably guided by the slider. The stopper portion (313) stops the spring member (43) from urging the slider (41) during movement of the slider along the ejection direction.

19 Claims, 5 Drawing Sheets

CARD EJECTOR HAVING A SLIDER AND A SPRING ENGAGING A STOPPER ON A METALLIC SHELL

BACKGROUND OF THE INVENTION

1. Field of the Invention

The present invention relates generally to an electrical card connector, and more particularly to an electrical card connector with structure to prevent abrupt ejection, i.e., anti-flying out, of an inserted card during withdrawing the card.

2. Description of Related Arts

Normally, an electrical card connector is provided on an electronic product for receiving an electrical card and thereby transmitting signals between the card and a printed circuit board. Micro SD card connectors are normally used in mobile phones and the connector comprises an insulative housing, a plurality of contacts received in the insulative housing, a card lock assembled at a front of the insulative housing for securing the card, an ejector assembled at the same side but a rear of the insulative housing relative to the card lock for ejecting the card, and a metallic shell covering the insulative housing. The ejector comprises a slider, a pin member, and a spring element cooperatively ejecting the card. The card lock is usually retained on the slider. The card usually defines a notch at a lateral side thereof and the card lock protrudes into the notch of the card so that the card moves along with the slider of the ejector. In connection with ejecting a card, the metallic shell may form an elastic piece in frictional contact with the slider to slow down the slider, aiming at preventing the card from flying out of the card connector. In an alternate design, the elastic piece is formed on the insulative housing instead of the metallic shell, also interfering with the slider, slowing down the slider, and anti-flying the card out of the card connector. However, friction force is only part of the resultant force exerted on the slider. Force from the spring element is still acting on the slider at the same time when the elastic piece starts to slow down the slider. Friction force exerted by the elastic piece may be weaker than the force from the spring element, resulting that the spring element pushes the slider, and the card still flies out of the card connector.

Hence, an electrical card connector with improved card anti-flying feature is desired.

SUMMARY OF THE INVENTION

Accordingly, an object of the present invention is to provide an electrical card connector with improved card anti-flying feature.

To achieve the above object, an electrical card connector includes an insulative housing, a number of contacts assembled in the insulative housing, an ejector assembled at a side of the insulative housing, and a metallic shell comprising a stopper portion. The ejector includes a slider moveable along a mating direction and an ejection direction opposite to the mating direction, a spring member for urging the slider to move along the ejection direction, and a pin member having one end secured on the insulative housing and the other one end moveably guided by the slider. The stopper portion stops the spring member from urging the slider during movement of the slider along the ejection direction.

Other objects, advantages and novel features of the invention will become more apparent from the following detailed description when taken in conjunction with the accompanying drawings.

DETAILED DESCRIPTION OF THE PREFERRED EMBODIMENT

Figure 1:
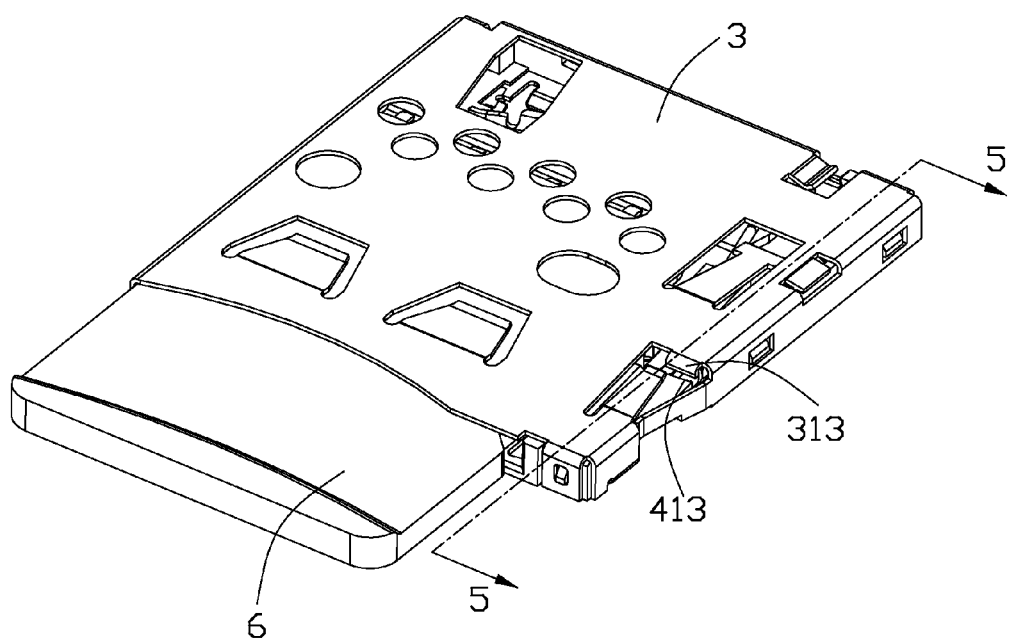
FIG. 1 is a perspective, assembled view of an electrical card connector constructed in accordance with the present invention with an electrical card inserted therein.

Reference will now be made in detail to the preferred embodiment of the present invention.

Referring to FIGS. 1-5, an electrical card connector 100 in accordance with the present invention, used for receiving an electrical card 6, comprises an insulative housing 1, a plurality of contacts 2 retained in the insulative housing 1, a metallic shell 3 covering the insulative housing 1, an ejector 4 assembled at a lateral side of the insulative housing 1, and a switch unit 5 assembled at a rear part of the insulative housing 1. The metallic shell 3 cooperates with the insulative housing 1 for defining a card receiving space 10. The electrical card 6 is inserted into the card receiving space 10 along a mating direction.

Figure 2:
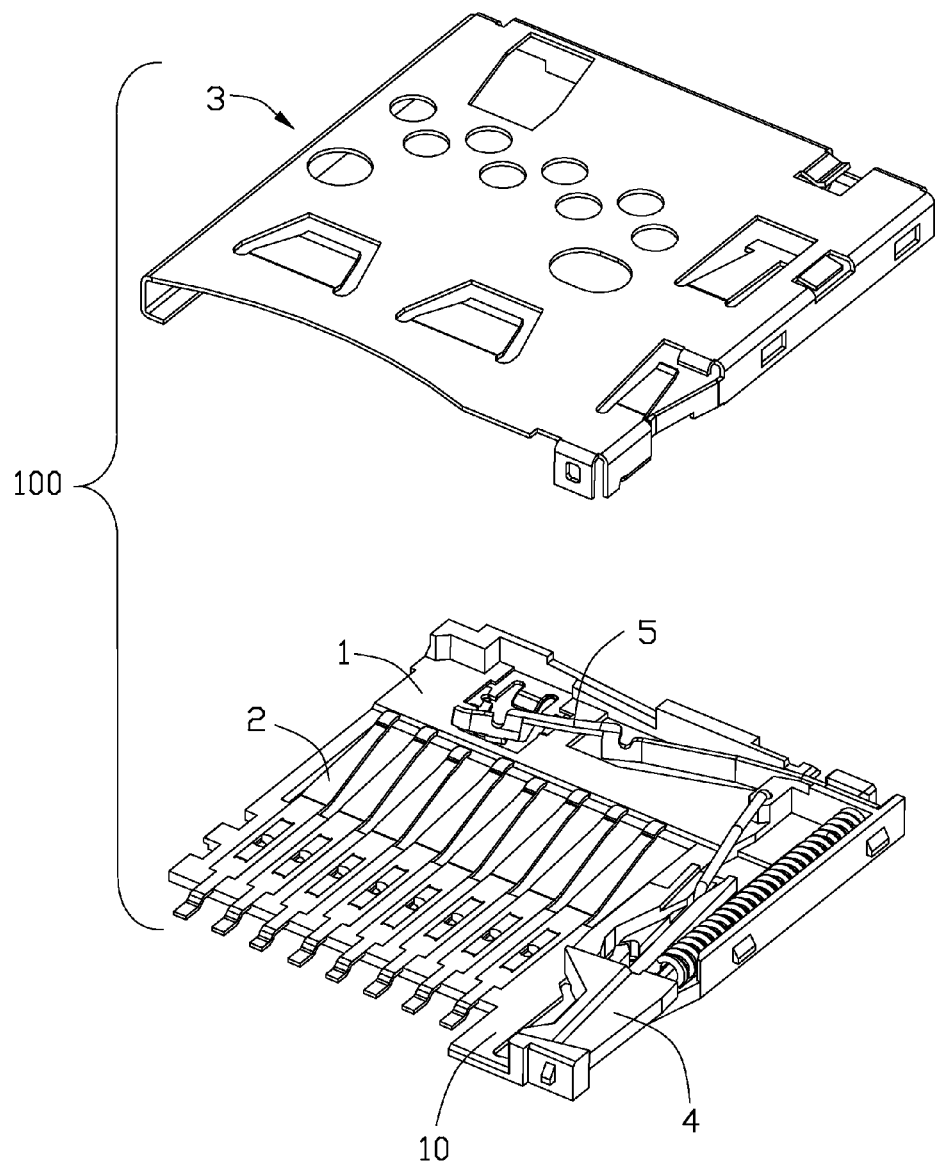
FIG. 2 is a perspective, partly exploded view of the electrical card connector.
Figure 3:
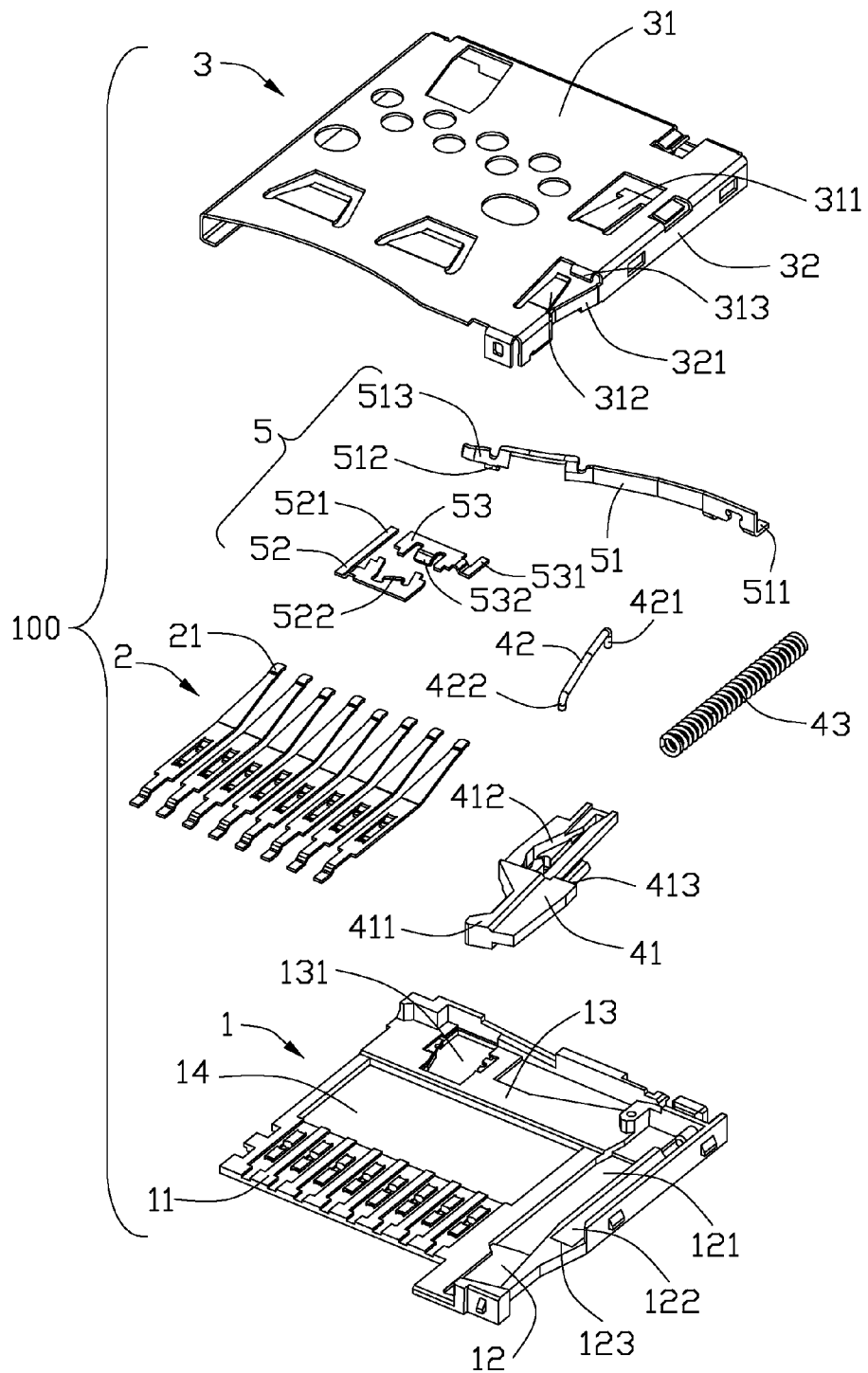
FIG. 3 is a perspective, fully exploded view of the electrical card connector.

Referring to FIGS. 2-3, the insulative housing 1 comprises a main portion 11 extending along a transverse direction perpendicular to the mating direction, a first retaining portion 12 connecting to a lateral side of the main portion 11 and extending along the mating direction, and a second retaining portion 13 connecting to a rear part of the main portion 11 and extending parallel with the main portion 11. The contacts 2 are retained at the main portion 11, the ejector 4 is assembled at the first retaining portion 12, and the switch unit 5 is assembled at the second retaining portion 13. The second retaining portion 13 spaces away from the main portion 11 such that an interspace 14 is defined between second retaining portion 13 and the main portion 11. The contacts 2 have a plurality of contacting portions 21 extending towards the second retaining portion 13. The contacting portions 21 are cantilevered upon the interspace 14 and are deformable into the interspace 14 when the card 6 is inserted. The second retaining portion 13 defines a cutout 131 for retaining the switch unit 5.

Figure 4:
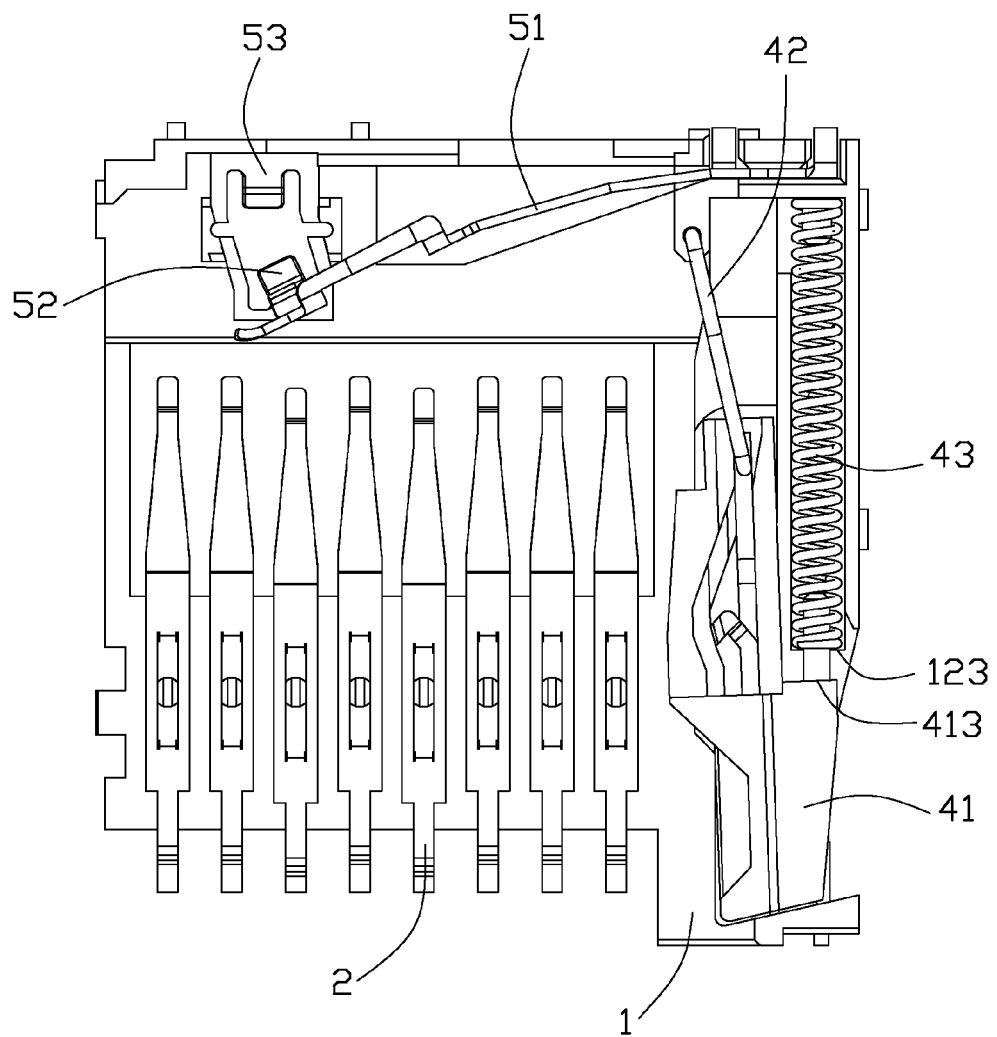
FIG. 4 is a top plan view of the electrical card connector with a top cover is removed away for clarity.
Figure 5:
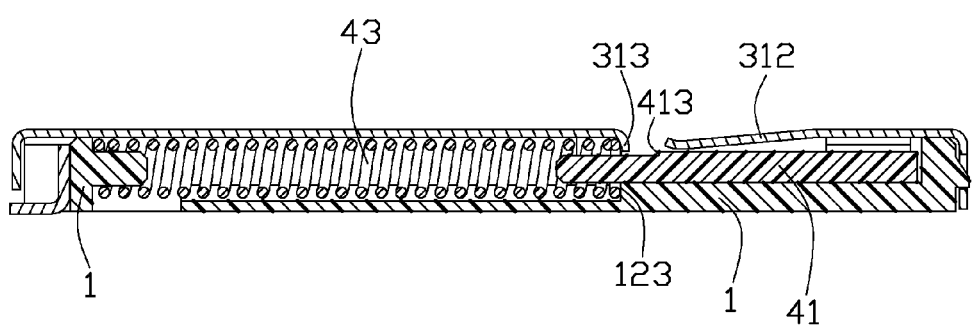
FIG. 5 is a cross-sectional view of the electrical card connector when taken along line 5-5 of FIG. 1.

Referring to FIGS. 2-4, the ejector 4 comprises a slider 41, a pin member 42, and a spring member 43 cooperatively ejecting the card 6. The first retaining portion 12 defines a lengthwise slot 121 for defining a path for the slider 41 and forms a recessed portion 122 at an outer edge of the lengthwise slot 121 for receiving the spring member 43. The slot 121 has a larger width at an outer position where the card 6 is fully ejected and a shorter width at an inner position where the card 6 is fully inserted and finally terminates. Therefore, the slider 41 has a lock portion 411 gradually bending towards the card receiving space 10 for securing into a notch (not shown) of the card 6 such that the slider 41 moves together with the card 6 along the mating direction. The slider 41 defines a heart-shaped slot 412 from an upper side thereof and an abutting edge 413 interfering with the spring member 43. The pin member 42 has a first end 421 secured to the rear part of the first retaining portion 12 and a second end 422 moveably received in the heart-shaped slot 412. At the front of the recessed portion 122, a front block wall 123 is formed.

Referring to FIG. 3, the metallic shell 3 comprises a flat portion 31 and a pair of sidewalls 32 extending downwardly from the flat portion 31. The flat portion 31 has a first cantilevered beam 311 formed at a middle part thereof for pressing against the pin member 42, preventing the pin member 42 from jumping out of the heart-shaped slot 412. The flat portion 31 has a second cantilevered beam 312 at a front part thereof for interfering with the slider 41, slowing down the slider 41 when the card 6 is in ejection. The sidewall 32 also forms a third cantilevered beam 321 interfering with the slider 41 when the card 6 is in ejection at the outer position. The third cantilevered beam 321 extends along an ejection direction opposite to the mating direction. The second cantilevered beam 312 extends along the mating direction. Corresponding to the positions of the pin member 42 and the spring member 43, the first cantilevered beam 311 is located nearer to the card receiving space 10 than the second cantilevered beam 312. The flat portion 31 further comprises a front stopper portion 313 between the first cantilevered beam 311 and the second cantilevered beam 312. The spring member 43 received in the recessed portion 122 is forcibly braked by the front stopper portion 313 such that the spring member 43 no more provides elasticity to the abutting edge 413 of the slider 41 when the card 6 is moved to a certain position during ejection.

Referring to FIGS. 1-4, the switch unit 5 comprises a moveable contact 51, a first immoveable contact 52, and a second immoveable contact 53. The moveable contact 51 has a soldering portion 511 extending out of the insulative housing 1, a deflecting portion 513 contacting with the inserted card 6, and a contacting portion 512 connection to either the first immoveable contact 52 or the second immoveable contact 53 for transmitting different signals. The first immoveable contact 52 has a first soldering pad 521 extending out of the insulative housing 1 for soldering on a printed circuit board and a first, front contacting pad 522 exposed in the cutout 131. The second immoveable contact 53 also has a second soldering pad 531 extending out of the insulative housing 1 for soldering on the printed circuit board and a second, rear contacting pad 532 exposed in the cutout 131. The first contacting pad 522 and the second contacting pad 532 are front-and-rear arranged and space away from each other. The deflecting portion 513 of the moveable contact 51 is pushed by the inserted card 6, the contacting portion 512 first connects with the first, front contacting pad 522 and transmits an "ON" signal, and then the contacting portion 512 moves away from the first, front contacting pad 522 but not achieves the second, rear contacting pad 532 and transmits an "OFF" signal, following, the contacting portion 512 connects with the second, rear contacting pad 532 and turns to "ON" signal but does not stabilize at the "ON" signal, the moveable contact 51 moves back to and terminates at the "OFF" location. Chronically said switch unit 5 experiences an "ON-OFF-ON-OFF" switch cycle when said card 6 is moved between the outer position and the inner position.

In an preferred embodiment of the present invention, the front stopper portion 311 is positioned above the front block wall 123 of the insulative housing 1 for cooperatively braking the spring member 43 at the certain position. Therefore, the spring member 43 no more provides elastic force to the abutting edge 413 of the slider 41 when the card 6 is moved to a certain position during ejection. When the card 6 is ejected from the inner position to the outer position, the slider 41 turns around laterally along the recessed portion 122, and therefore, the lock portion 411 slightly separates away from the notch of the card 6. The third cantilevered beam 321 interferes with the slider 41 for preventing the slider 41 from excessively turning around, thereby preventing the card 6 from easily dropping out of the card receiving space 100 at the outer position. The card 6 is not ejected from the card receiving space 100 until the user pulls the card 6 therefrom, which at this moment becomes easier because the spring member 43 is not exerting any force on the slider 41 tending to lock the lock portion 411 to the card 6.

In the present invention, the spring member 43 is forcedly braked by front stopper portion 313 of the metallic shell 3 at least. Therefore, the spring member 43 no more provides elastic force to the slider 41. The spring member 43 is compelled to separate from the slider 41. Finally, the slider 41 is slowed down by interfering with the second cantilevered beam 312. Because the slider 41 accepts no more pushing force from the spring member 43, the slider 41 is easily slowed down and is prevented from flying out of the card connector 100 during ejecting the card 6.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An electrical card connector comprising:
   an insulative housing;
   a plurality of contacts assembled in the insulative housing;
   an ejector assembled at a side of the insulative housing, the ejector comprising a slider moveable along a mating direction and an ejection direction opposite to the mating direction, a spring member for urging the slider to move along the ejection direction, and a pin member having one end secured on the insulative housing and the other one end moveably guided by the slider; and
   a metallic shell comprising a stopper portion stopping the spring member for not pushing the slider during movement of the slider along the ejection direction.

2. The electrical card connector as claimed in claim 1, wherein the metallic shell forms a cantilevered beam interfering with an upper face of the slider and slowing down the slider.

3. The electrical card connector as claimed in claim 1, wherein the metallic shell forms a cantilevered beam interfering with a lateral face of the slider.

4. The electrical card connector as claimed in claim 1, wherein the insulative housing defines a recessed portion for receiving the spring member and a block wall is formed at a front of the recessed portion.

5. The electrical card connector as claimed in claim 4, wherein the stopper portion is located above the block wall and both the stopper portion and the block wall contribute to stoppage of the spring member.

6. The electrical card connector as claimed in claim 5, wherein the stopper portion interferes with an upper side of the spring member and the block wall interferes with a lower side of the spring member.

7. The electrical card connector as claimed in claim 1, wherein the slider forms a lock portion gradually moving towards a card receiving space during movement of the slider along the mating direction.

8. The electrical card connector as claimed in claim 7, wherein the insulative housing defines a slot guiding the slider, and the slot has a larger width at an outer position where a card is fully ejected and a shorter width at an inner position where the card is fully inserted and finally terminates.

9. The electrical card connector as claimed in claim 1, further comprising a switch unit assembling at a rear of the insulative housing with respect to the contacts.

10. The electrical card connector as claimed in claim 9, wherein the insulative housing comprises a second retaining portion with a cutout, and the switch unit comprises a moveable contact deflectable above the second retaining portion and a pair of immoveable contacts received and exposed in the cutout.

11. The electrical card connector as claimed in claim 10, wherein the immoveable contacts have a pair of contacting pads front-and-rear arranged in the cutout and spaced apart from each other.

12. The electrical card connector as claimed in claim 11, wherein said switch unit experiences an "ON-OFF-ON-OFF" switch cycle when a card is moved between an outer position at which a card is fully ejected and an inner position at which the card is fully inserted and finally terminates at the inner position.

13. An electrical card connector comprising:
an insulative housing defining a contact area and an ejector area beside the contact area in a transverse direction;
a metallic shell assembled to the housing and cooperating with the housing to define a card receiving cavity on both the contact area and the ejection mechanism area, at least one of the housing and the shell defines a stopper face;
a plurality of contacts disposed in the contact area with contacting sections extending into the card receiving cavity;
an ejector disposed in the ejector area and comprising a slider movable back and forth essentially between opposite outer and inner positions along a front-to-back direction perpendicular to the transverse direction, said slider defining a locking lug extending into the card receiving cavity in the transverse direction for engagement with an electronic card which is adapted to be received in the card receiving cavity; and
a spring having one end essentially constantly biasing the slider toward the outer position until said spring is located at a position corresponding to the outer position where said stopper face abuts against said one end of the spring in the front-to-back direction to prevent the spring from further forward moving.

14. The electrical card connector as claimed in claim 13, wherein the shell defines a spring beam abutting against the ejector toward the housing, in a vertical direction perpendicular to both said transverse direction and said front-to-back direction, for assuring the ejector is retained to the housing.

15. The electrical card connector as claimed in claim 13, wherein the ejector further defines a heart-shaped groove structure receiving one end of a pin member whose another end is retained to the housing.

16. The electrical card connector as claimed in claim 15, wherein the shell defines a spring beam constant urging the pin member toward the heart-shaped groove structure in the vertical direction perpendicular to both said transverse direction and said front-to-back direction.

17. The electrical card connector as claimed in claim 13, wherein both said shell and said housing form the corresponding stopper faces.

18. An electrical card connector comprising:
an insulative housing defining a contact area and an ejector area beside the contact area in a transverse direction;
a metallic shell assembled to the housing and cooperating with the housing to define a card receiving cavity on both the contact area and the ejection mechanism area;
a plurality of contacts disposed in the contact area with contacting sections extending into the card receiving cavity;
an ejector disposed in the ejector area and comprising a slider movable back and forth essentially between opposite outer and inner positions along a front-to-back direction perpendicular to the transverse direction, said slider defining a locking lug extending into the card receiving cavity in the transverse direction for engagement with an electronic card which is adapted to be received in the card receiving cavity; and
a spring having one end applying an outward force upon a face of the slider toward the outer position when the slider is located at the inner position while said one end is parted from said face when said slider is moved to the outer position thus applying no outward force upon said face so as to facilitate tilting the slider for withdrawal of the electronic card.

19. The electrical card connector as claimed in claim 18, wherein both said shell and said housing form the corresponding stopper faces.

* * * * *